United States Patent  [11] 3,586,366

[72] Inventor Lawrence M. Patrick
  Detroit, Mich.
[21] Appl. No. 817,632
[22] Filed Apr. 21, 1969
[45] Patented June 22, 1971
[73] Assignee American Safety Equipment Corporation
  New York, N.Y.

[54] INERTIA-RESPONSIVE RETRACTABLE HEAD RESTRAINT DEVICE
  8 Claims, 7 Drawing Figs.
[52] U.S. Cl. ................................................. 297/391, 297/410
[51] Int. Cl. .................................................. A47c 7/36, A47c 7/42
[50] Field of Search .................................. 297/216, 391, 397, 403, 408, 410

[56] References Cited
UNITED STATES PATENTS
3,186,763  6/1965  Ferrar ........................ 297/410
3,307,874  3/1967  Wilson ........................ 297/410

Primary Examiner—Casmir A. Nunberg
Attorney—Miketta, Glenny, Poms and Smith

ABSTRACT: An inertia-responsive retractable head restraint device for use in conjunction with a vehicle seat back to prevent rearward motion of an occupant's head upon rapid acceleration of the vehicle thereby preventing whiplash injury to the occupant.

PATENTED JUN 22 1971 3,586,366
SHEET 1 OF 3
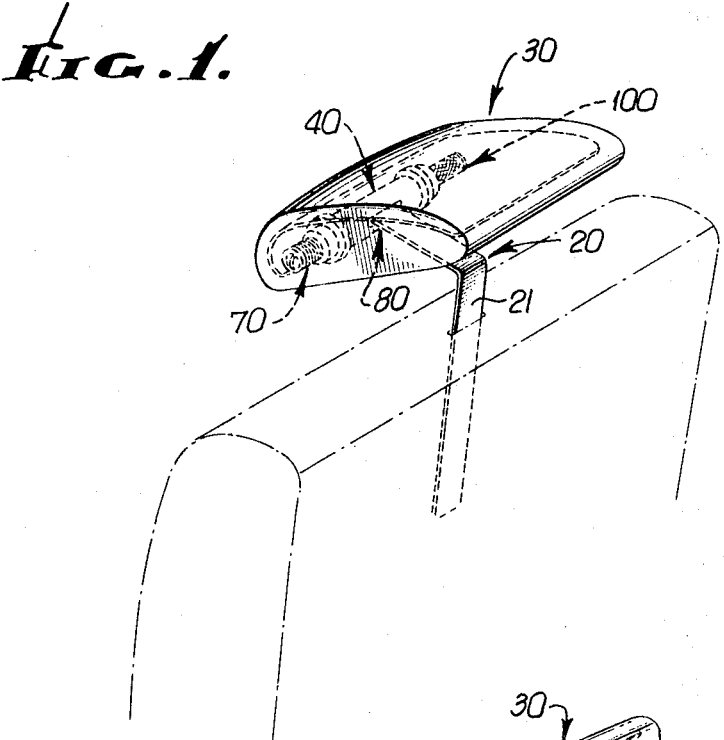
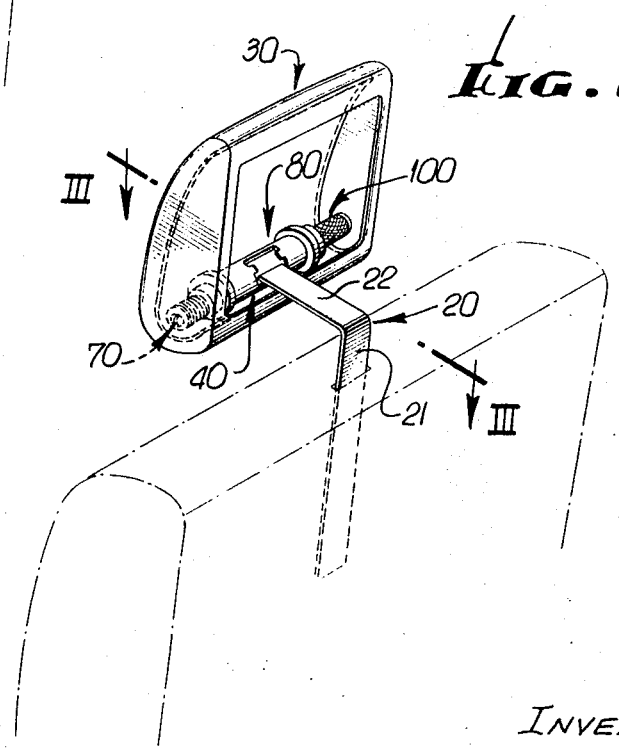
INVENTOR.
LAWRENCE M. PATRICK
By
Miketta, Glenny, Poms & Smith
ATTORNEYS.

PATENTED JUN22 1971 3,586,366

INVENTOR.
LAWRENCE M. PATRICK
By
Miketta, Glenny, Poms & Smith
ATTORNEYS.

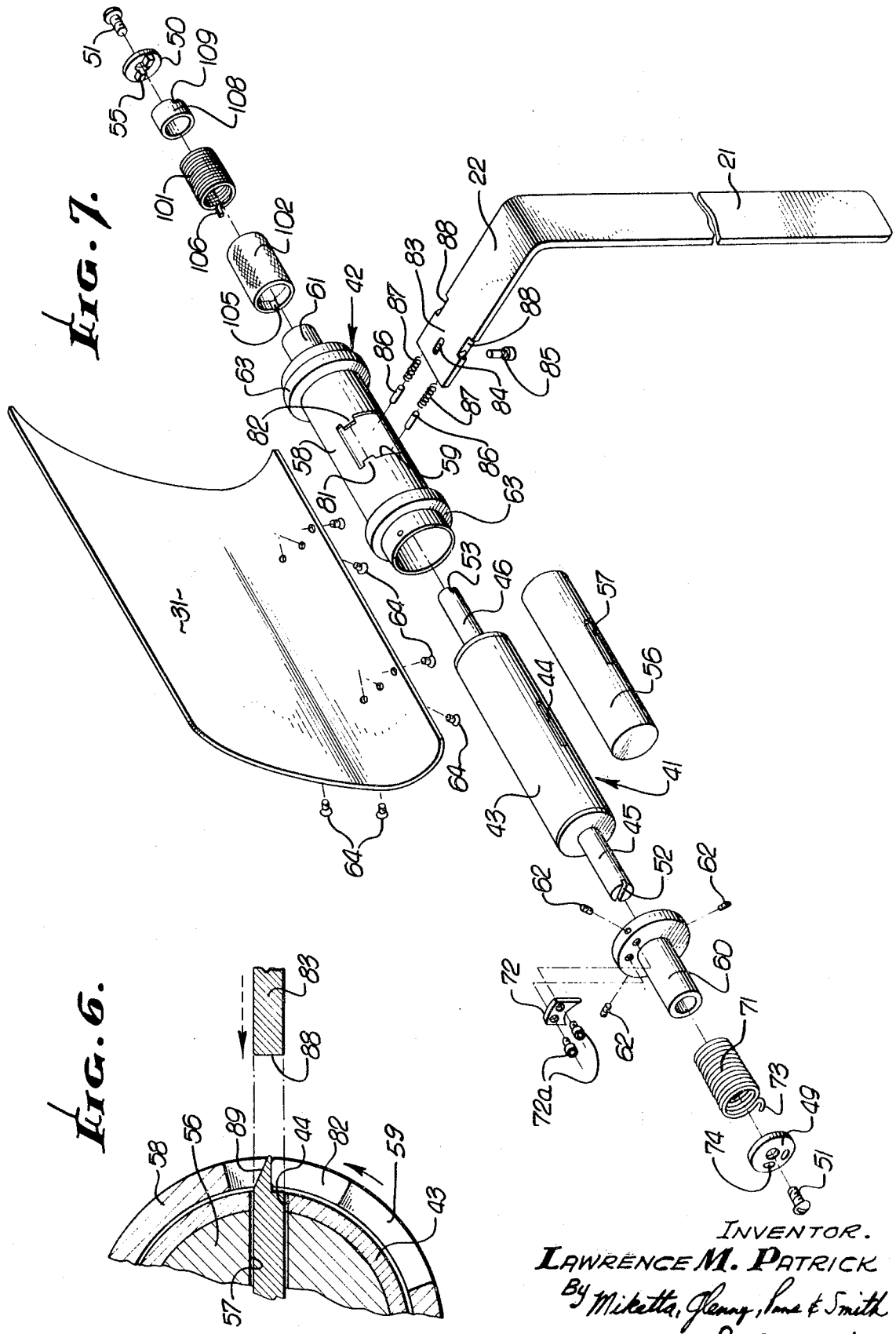

INERTIA-RESPONSIVE RETRACTABLE HEAD RESTRAINT DEVICE

The present invention generally relates to a safety device for use in vehicles. More specifically, this invention provides a device for restraining rearward movement or rotation (hyperextension) of the head and neck of an occupant upon rapid acceleration of the vehicle in which the device is mounted. The rapid acceleration of the vehicle giving rise to the need for head support most commonly occurs in automobile accidents generally known as a "rear end" collision. The rapid, if not violent, acceleration of the vehicle causes the occupant's head to be thrown rearwardly causing spinal damage. This type of injury to the occupant is well known and commonly referred to as "whiplash" injury.

Another potential source of whiplash injury has been created by the now general use of safety belt restraint systems in automobiles. Investigations of crash dynamics has shown that upon rapid deceleration of a vehicle the upper torso of an occupant is thrown forwardly, or more accurately, pivots forwardly about the waist of the occupant. This movement of the upper torso of the occupant causes considerable elastic deformation or elongation of the upper torso belt or strap which eventually causes the occupant's upper torso to be thrown rearwardly back against the automobile seat back. This rearward movement of the upper torso of the occupant is, of course, accompanied by rapid rearward movement of the occupant's head giving rise to the same requirement for a rearward head restraint device when the upper torso is stopped by the seat back while the head tends to continue its rearward motion.

In the present state of the art, some automobiles are provided with headrests which are integral portions of the vehicle seat back, such as in the Volkswagon 1968 and 1969 models. Another type of headrest is a vertically adjustable headrest, such as in the 1969 automobiles. In the latter type of system, the headrest is mounted on a support member which is received in the seat back and is vertically adjustable with respect thereto so as to accommodate passengers or occupants of different height. These headrests provide a head support area which a vehicle passenger may use to rest his head during normal operation of the vehicle. Of course, such headrest will also function to prevent rearward head movement in the event of an emergency. However, such stationary headrests are intentionally designed and positioned to prevent a driver from resting his head to prevent accidental dozing.

There are several disadvantages to the present state of the art headrests which are overcome by the present invention. Succinctly stated, such defects reside in the fixed height of the headrest relative to the seat back. One serious disadvantage of the fixed height of the headrest, which in itself causes a safety problem, is that the headrest obscures the rearview vision of the driver of the vehicle. Although the problem may be alleviated in part by a proper configuration of the headrest, the problem cannot be removed in its entirety.

Another disadvantage of the fixed height headrest, as used in current automobiles, is that the automobile passengers in the front and rear seats of the automobile are prevented from carrying on a conversation since the fixed height headrest interferes.

There are other disadvantages to the fixed height type of headrest which preclude such device from providing an effective safety head restraint device. Accordingly, it is a general object of the present invention to provide a retractable head restraint device that avoids all of the foregoing disadvantages of fixed height types of headrests used heretofore.

Another object of the present invention is to provide an inertia-responsive retractable head restraint device for use in conjunction with the back of a vehicle seat and is normally in a retracted position allowing the seat occupants unrestricted rearview vision but which is movable into an erect position for restraining rearward head movement upon rapid acceleration of the vehicle.

A further object of the present invention is to provide an inertia-responsive retractable head restraint device which is movable from a normally retracted position to an erect position in immediate response to a forward change in velocity of the vehicle in which the device is mounted.

One more object of the present invention is to provide an inertia-responsive retractable head restraint device comprising a head restraint pad which is pivotally mounted to a restraint pad support carried by the seat of the vehicle.

Still one more object of the present invention is to provide an inertia-responsive retractable head restraint device comprising a restraint pad which is pivotally mounted to a restraint pad support member that is vertically, adjustably carried by the seat back of the vehicle.

One further object of the present invention is to provide an inertia-responsive retractable head restraint device including a restraint pad movably mounted with respect to a restraint pad support member that is removably attachable to the seat back of a vehicle. Still one further object of the present invention is to provide an inertia-responsive retractable head restraint device including a restraint pad pivotally mounted with respect to a restraint pad support member and which includes provision for maintaining the restraint pad in a partial or fully erect position after release by the inertia-responsive latch device.

One more object of the present invention is to provide a retractable head restraint device which is reliable in operation and relatively inexpensive to manufacture and includes a head restraint pad carried by a vehicle seat back in a normally retracted position wherein the pad has a cross-sectional configuration which generally conforms to the upper portion of the seat back so as to provide a pleasing aesthetic appearance.

Generally stated, the present invention comprises a retractable, inertia-responsive head restraint device for use in conjunction with the seat back of a vehicle to prevent rearward motion of the occupant's head upon rapid acceleration of the vehicle thereby preventing the occurrence of whiplash injury to the occupant and generally comprising a restraint pad mounted for movement from a normally retracted position to an erect position adjacent the occupant's head, restraint pad support means carried by the seat back, means for movably mounting the restraint pad carried by the restraint pad support means, means biasing the restraint pad to the erect position, latch means for normally retaining the restraint pad in the retracted position, and inertia-responsive means in operative engagement with the latch means so as to release the restraint pad upon rapid acceleration of the vehicle. The invention may also comprise means for maintaining the restraint pad in an erect position after release thereof.

Other objects and advantages of this invention will be readily apparent from the following description when considered in connection with the appended drawings.

IN THE DRAWINGS:

FIG. 1 is a perspective view of an exemplary retractable head restraint device constructed in accordance with the present invention and carried by a vehicle seat back, shown in the retracted position;

FIG. 2 is a perspective view of the restraint device illustrated in FIG. 1, shown in the erect position;

FIG. 6 is a detailed sectional view taken along the plane VI-VI of FIG. 3; and

FIG. 7 is an exploded sectional view of the restraint device of FIG. 1.

Figure 3:
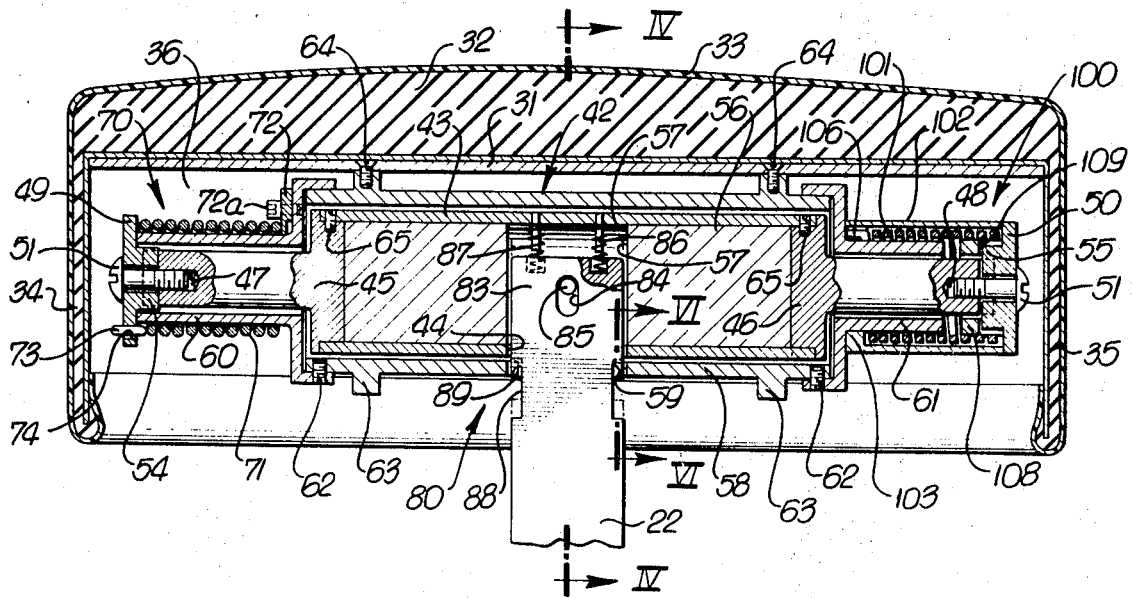
FIG. 3 is a sectional view of the restraint device of FIG. 1 taken along the plane III-III of FIG. 2.

Referring now to the drawings, particularly FIGS. 1 and 2, there is shown a portion of a vehicle seat back, such as may be used in an automobile, and which may be of the bench or bucket type. Generally, the head restraint device used in conjunction with the seat back includes restraint pad support means, indicated generally at 20; a restraint pad, indicated generally at 30; means for movably mounting the restraint pad, indicated generally at 40; means for biasing the restraint pad to an erect position, indicated generally at 70; inertia-responsive latch means, indicated generally at 80; and means for maintaining the restraint pad in the erect position, indicated generally at 100.

In the exemplary embodiment, the restraint pad support means 20 comprises a vertical support member 21 and a support extension member 22 integrally connected at approximately a right angle to member 21. The vertical support member 21 is slidably, adjustably mounted in the vehicle seat back so that the restraint pad may be manually positioned vertically relative to the occupant's head. Vertical positioning of the restraint pad support means so as to accommodate passengers of different body height, for use of the restraint pad during normal operation of the vehicle, is well known in the art. It should also be appreciated, however, that the head restraint device of the present invention may be supported by other means, such as the frame disclosed in U.S. Pat. No. 2,632,497 which may be easily removed from the seat back. In the exemplary embodiment, restraint pad 30 comprises a plate 31, as seen best in FIG. 5, which is curved similar to the upper surface of an airfoil. A soft resilient flexible body 32 of material, such as rubber or certain types of plastic, is enclosed in a skin 33 of fabric, leather or the like, and is suitably secured to curved plate 31. The enclosed flexible body includes side portions 34, 35 (see FIG. 3) so as to form a chamber indicated generally at 36. It should be understood that the cross-sectional configuration of the restraint pad of the exemplary embodiment is particularly adapted to minimize any projection above the upper edge of the seat back when the head rest is in the retracted and vertically downwardly adjusted position. It will be apparent that other types of cross-sectional configurations may be employed depending upon the configuration of the seat back and the type of restraint pad support means employed. It is of course preferable that the restraint pad have a shape which defines a chamber in which the actuating components of the restraint device may be enclosed.

The restraint device also includes means 40 for movably mounting restraint pad 30 so as to be movable from a retracted position in which rearview vision is minimized, to an operative position during an emergency. In the emergency. In embodiment, such means comprises hinge means including a first cylindrical mounting member indicated generally at 41 and a second cylindrical mounting member indicated generally at 42 and rotatably mounted with respect to the first cylindrical mounting member 41. First or inner cylindrical mounting member 41 includes a tubular portion 43 open at each end and having an elongated transverse opening 44 disposed generally intermediate the ends thereof. Each end of tubular member 43 is closed by a stub axle 45, 46 secured by means of setscrews 65. Axles 45, 46 are provided with reduced diameter portions and include threaded axially extending openings 47, 48 in the outer ends thereof, respectively. Retainer members 49, 50 are secured to the free ends of axles 45, 46, respectively, by means of machine screws 51. Retainer members 49, 50 have an outer diameter greater than the diameter of the reduced diameter portion of axles 45, 46 for retaining the second cylindrical member 42 on member 41, in a manner to be explained more fully hereinafter.

The outer ends of axles 45, 46 are also provided with transverse slots 52, 53 (see FIG. 7) for receiving transverse lugs 54, 55, respectively. In this manner, the retainer members 49, 50 are prevented from rotating with respect to the axles 45, 46. An insert 56 having an elongated opening 57 is disposed within cylinder 41 and fixedly mounted with respect thereto through means not shown. Opening 57 is in registry with opening 44.

The second or outer cylindrical mounting member 42 rotatably mounted on inner member 41 generally comprises a tubular section 58 open at each end and having an elongated arcuate opening 59 disposed generally intermediate the ends thereof. Each end of tubular member 58 carries generally cylindrical end caps 60, 61 having enlarged inner end portions secured to the ends of tubular member 58 through setscrews 62. Each of the end caps 60, 61 have reduced diameter portions concentrically mounted about the reduced diameter portions of stub axles 45, 46. The restraint pad plate 31 is secured to the annular shoulder 63 of outer cylindrical mounting member 42 by means of a plurality of screws 64.

The retractable head restraint device of the present invention also includes means 70 biasing the second cylindrical member for rotatable movement relative to the first cylindrical member, which in the exemplary embodiment includes a coil spring 71 concentrically mounted around second cylindrical member end cap 60. One end of coil spring 71 is secured to the annular shoulder of the end cap by means of a clamp element 72 and a pair of machine screws 72a (see FIG. 7). The opposite end of the coil spring includes a tab portion 73 inserted in an opening 74 in retainer member 49 affixed to the inner cylindrical member. It will therefore be seen that spring 71 rotatably biases the second cylindrical member 42 with respect to the first cylindrical member 41.

Figure 5:
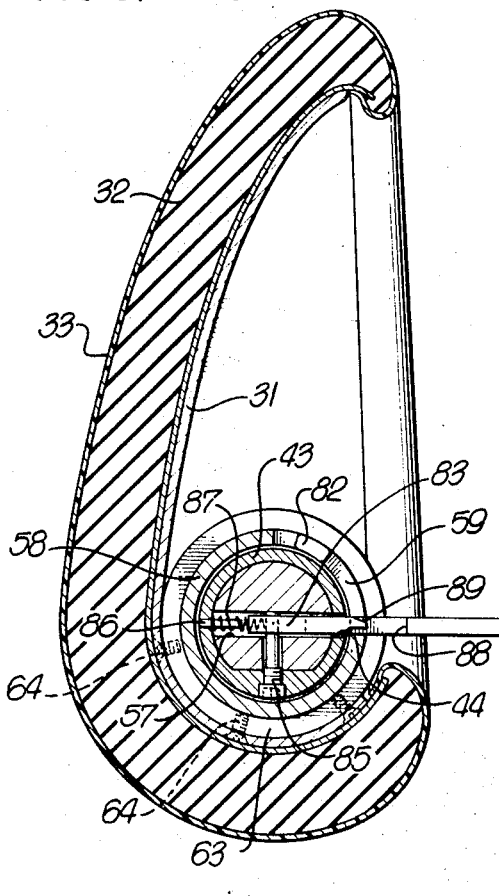
FIG. 5 is a sectional view of the restraint device as illustrated in FIG. 4, shown in the erect position.
Figure 4:
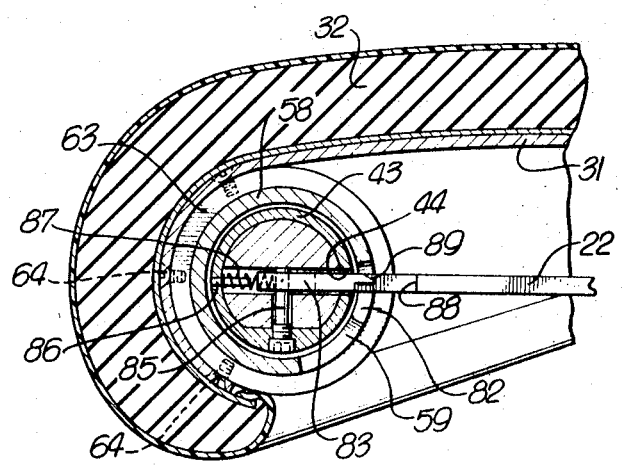
FIG. 4 is a partial sectional view taken along the plane IV-IV of FIG. 3.

The retractable head restraint device also includes inertia-responsive latch means 80 for normally retaining the restraint pad 30 in the retracted inoperative position and for releasing the restraint pad upon rapid acceleration of the vehicle. In the present embodiment, such means comprises a pair of lugs 81, 82 extending axially inwardly from opposite arcuate edges of the opening 59 in second cylindrical member 42. The latch means also includes a substantially flat, generally rectangular cross section tongue member indicated generally at 83. The tongue member may comprise an elongated extension of horizontal restraint member 22. The forward portion of the tongue member is adapted for insertion through the opening 59 in the second cylindrical opening, the transverse opening 44 in the first cylindrical member, and opening 57 in insert 56. A longitudinally extending slot 84 is provided in the forward end of the tongue member which is inserted into the first and second cylindrical members. A threaded pin 85, as seen best in FIGS. 4 and 5, is threadedly mounted in the first cylindrical member 41 with its free end projecting into slot 84 so as to restrict movement of the first and second cylindrical members relative to the tongue member 83. A pair of pins 86 are transversely mounted in tubular member 43 extending within the hollow portion thereof and supporting a pair of springs 87 for normally urging the first and second cylindrical members away from tongue member 83. The longitudinal edges of tongue member 83 are provided with notches 88 including an inclined wall portion 89 (see FIGS. 4 and 5).

It will now be seen that the first and second cylindrical members carrying the restraint pad constitute a free mass slidably mounted on the extension of the restraint pad support means mounted on a fixed mass. The spring means 87 normally biases the free mass away from tongue member 83 so that the lugs 81 and 82 bear against the under surface of the inclined wall portions 89 of the tongue member. In this position, the second cylindrical member is biased for rotational movement with respect to the first cylindrical member which is nonrotatably mounted on the restraint pad support member. When the vehicle is rapidly accelerated, i.e., the fixed mass is moved forward rapidly, the inertia of the free mass allows the tongue member 83 to overcome the bias of spring means 87 whereby the lugs 81, 82 may pass through notches 88 allowing the second cylindrical member and the restraint pad mounted thereon to rotate counterclockwise, as viewed in FIG. 4, to the operative position as shown in FIG. 5.

The head restraint device of the present invention also includes means for maintaining the restraint pad in the erect position after release thereof by the latch means. In the exemplary embodiment, such means comprises a "one-way clutch," indicated generally at 100. The clutch 100 includes a helical clutch spring 101 concentrically mounted about second cylinder end cap 61 and axially restrained by means of retainer 50. The clutch also includes a sleeve 102 concentrically mounted around the clutch spring 101. The inner end of sleeve 102 includes a radially inwardly projecting portion 103 including an axial slot 105 for receiving a tab 106 on the inner end of helical clutch spring 101. A collar 108 is also concentrically mounted about the reduced diameter portion of stub axle 46 axially adjacent the outer end of second cylindrical member end cap 61 and also circumscribed by clutch spring 101. Collar 108 has a transverse slot 109 in the end thereof for receiving lug 55 on retainer 50 so that collar 108 is rotatably locked to inner cylindrical member stub axle 61. The outer surface of sleeve 102 may be knurled for ease in grasping thereof.

In operation, when the restraint pad and the outer cylindrical member 42 is released for rotation about inner cylindrical member 41, one-way clutch 100 permits counterclockwise rotation so that the restraint pad may be urged to its erect position. When the occupant's head strikes the restraint pad 30, a clockwise torque is applied to the second cylindrical member but rotation thereof is prohibited by the locking action of one-way clutch 100. It will be appreciated that in the event that the occupant's head prevents full rotation of the second cylindrical member with respect to the first cylindrical member by striking the restraint pad 30 before it reaches its maximum erect position, the one-way clutch 100 will still preclude clockwise rotation of the restraint pad from this nonfully erect position. To relatch the restraint pad in its normally retracted position, the restraint pad is manually rotated clockwise against the bias of the means 71 by turning sleeve 102 clockwise so as to disengage the clutch spring 101 whereby the second cylindrical member 42 may rotate with respect to the first cylindrical member 41. It will also be understood that other means for maintaining the restraint pad in the erect position after release by the latch means may be employed in the present invention.

It will now be seen that all of the foregoing objects are accomplished by the exemplary embodiment of a retractable head restraint device including an inertia-responsive latch. Other modifications and variations of the present invention are possible in light of the above teachings. It is therefore to be understood that within the scope of the appended claims, the invention may be practiced otherwise than as specifically described.

I claim:
1. A retractable head restraint device for use in conjunction with a vehicle seat back to limit rearward motion and rotation of an occupant's head upon rapid acceleration of the vehicle, comprising:
    a restraint pad mounted for movement from a normally retracted position to an erect position vertically spaced from the seat back and adjacent the occupant's head;
    means for movably mounting said restraint pad carried by restraint pad support means;
    means biasing said restraint pad to the erect position; and
    inertia-responsive latch means for normally retaining said restraint pad in said retracted position and for releasing said restraint pad upon rapid acceleration of said vehicle permitting the biasing means to move the restraint pad towards the erect position.
2. The retractable head restraint device of claim 1 additionally including means for maintaining said restraint pad in the erect position after release thereof.
3. The retractable head restraint device of claim 2 wherein said means for maintaining said restraint pad in erected position includes means actuated by partial or complete erection of said restraint pad so as to render said maintaining means operative.
4. The retractable head restraint device of claim 1 wherein said means for movably mounting said restraint pad includes means for pivotally connecting said restraint pad to said restraint pad support means.
5. The retractable head restraint device of claim 3 wherein said means for pivotally connecting said restraint pad to said restraint pad support means includes a first cylindrical member nonrotatably mounted on said restraint pad support means and a second cylindrical member concentrically rotatably mounted with respect to said first member and supporting said restraint pad.
6. The retractable head restraint device of claim 1 wherein said restraint pad support means is vertically adjustably supported by said seat back.
7. The retractable head restraint device of claim 1 wherein said restraint pad support means comprises a removably attachable frame for snugly fitting on the seat back.
8. A retractable head restraint device to limit rearward motion and rotation of a vehicle passenger's head, comprising:
    a restraint pad including a soft, flexible body carried by a plate and movable from a normally retracted position to an erect position adjacent the occupant's head;
    a restraint pad support member fixedly carried by a portion of the vehicle;
    a first cylindrical mounting member including an elongated transverse opening disposed generally intermediate the ends of said member and carried by said restraint pad support member;
    a second cylindrical mounting member fixedly secured to said restraint pad plate, rotatably mounted with respect to said first cylindrical mounting member and including an elongated arcuate opening axially aligned with said elongated transverse opening in said first cylindrical member;
    means biasing said second cylindrical member for rotatable movement relative to said first cylindrical member; and
    inertia-responsive latch means including a pair of lugs axially projecting toward one another from opposite arcuate edges of said opening in said second cylindrical member, a substantially flat, generally rectangular cross section, elongated extension member on said restraint pad support member passing through said opening in said second cylindrical member and slidably received in said transverse opening in said first cylindrical member, said extension member longitudinal edges having notches therein including inclined walls for cooperative selective engagement with said pair of lugs; and
    spring means disposed in said first cylindrical member transverse opening biasing said cylindrical members away from said extension member,
    whereby a sudden acceleration of said vehicle and said fixed restraint pad support member including said extension member overcomes the bias of said spring means causing disengagement of said lugs and said notch walls releasing said second cylindrical member for rotation relative to said first cylindrical member so as to erect said restraint pad to an operative position.